(12) United States Patent
Trainin et al.

(10) Patent No.: US 9,351,313 B2
(45) Date of Patent: *May 24, 2016

(54) DEVICE, SYSTEM AND METHOD OF COMMUNICATING DURING A CONTENTION BASED ACCESS PERIOD

(71) Applicant: INTEL CORPORATION, Santa Clara, CA (US)

(72) Inventors: Solomon B. Trainin, Haifa (IL); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/533,270

(22) Filed: Nov. 5, 2014

(65) Prior Publication Data

US 2015/0055610 A1    Feb. 26, 2015

Related U.S. Application Data

(63) Continuation of application No. 13/536,145, filed on Jun. 28, 2012, now Pat. No. 8,923,252.

(60) Provisional application No. 61/585,350, filed on Jan. 11, 2012.

(51) Int. Cl.
  *H04J 3/00* (2006.01)
  *H04W 72/12* (2009.01)
  *H04W 74/08* (2009.01)

(52) U.S. Cl.
  CPC .......... *H04W 72/1226* (2013.01); *H04W 74/08* (2013.01); *H04W 74/0808* (2013.01)

(58) Field of Classification Search
  USPC ........................................................ 370/336
  See application file for complete search history.

(56) References Cited

U.S. PATENT DOCUMENTS 4,931,802 A * 6/1990 Assal et al. ................... 342/356
8,345,547 B2   1/2013 Park
8,923,252 B2  12/2014 Trainin et al.

(Continued)

FOREIGN PATENT DOCUMENTS

EP    1335545    8/2003
EP    1357705    10/2003
EP    1641180    3/2006

OTHER PUBLICATIONS

Wireless Gigabit Alliance (WGA) Specifications; WiGig MAC and PHY Specification Version 1.0, Apr. 2010—Final Specification; 311 pages.

(Continued)

*Primary Examiner* — Omar Ghowrwal
*Assistant Examiner* — Angel Brockman
(74) *Attorney, Agent, or Firm* — Shichrur & Co.

(57) ABSTRACT

Some demonstrative embodiments include devices, systems and/or methods of communicating during a Contention-Based-Access-Period (CBAP). For example, a device may include a wireless communication station to transmit a wireless communication transmission over a wireless communication medium upon determining that the wireless communication medium is idle for a predefined time period within a contention-based-access period (CBAP), if a scheduling element allocating the CBAP includes an indication of an identity of the wireless communication station in a predefined field.

21 Claims, 3 Drawing Sheets

(56) References Cited

U.S. PATENT DOCUMENTS

| | | |
|---|---|---|
| 2004/0071154 A1 | 4/2004 | Wentink |
| 2005/0135284 A1 | 6/2005 | Nanda et al. |
| 2006/0268746 A1 | 11/2006 | Wijting et al. |
| 2010/0080188 A1 | 4/2010 | Ho et al. |
| 2010/0135167 A1 | 6/2010 | Ma et al. |
| 2010/0265895 A1 | 10/2010 | Bracha |
| 2011/0150004 A1 | 6/2011 | Denteneer et al. |
| 2011/0317630 A1 | 12/2011 | Zhu et al. |
| 2013/0176993 A1* | 7/2013 | Trainin et al. ............... 370/336 |

OTHER PUBLICATIONS

IEEE Std 802.11™-2007 (Revision of IEEE Std 802.11-1999) IEEE Standard for Information technology—Telecommunications and information exchange between systems—Local and metropolitan area networks—Specific requirements. Part 11: Wireless Lan Medium Access Control (MAC) and Physical Layer (PHY) Specifications, Jun. 12, 2007,1232 pages.

International Search Report and Written Opinion for PCT Patent Application No. PCT/US2013/020758, mailed on Apr. 30, 2013, 10 pages.

International Preliminary Report on Patentability and Written Opinion for PCT Patent Application No. PCT/US2013/020758, mailed on Jul. 24, 2014, 7 pages.

Office Action for U.S. Appl. No. 13/536,145, mailed on Oct. 25, 2013, 22 pages.

Final Office Action for U.S. Appl. No. 13/536,145, mailed on Apr. 16, 2014, 19 pages.

Extended European Search Report for European Patent Application No. 13736103.6, mailed on Jul. 2, 2015, 7 pages.

\* cited by examiner

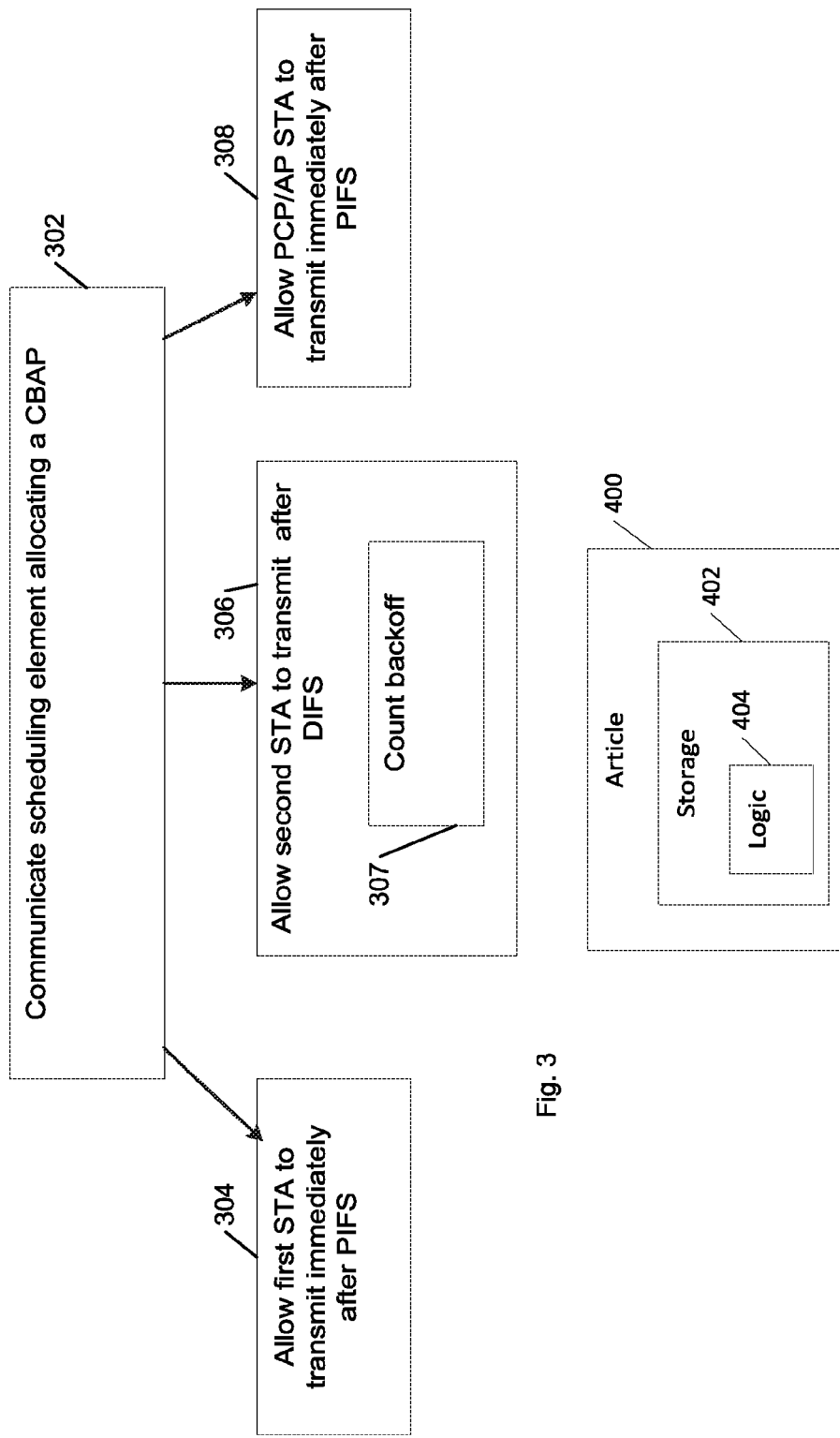

DEVICE, SYSTEM AND METHOD OF COMMUNICATING DURING A CONTENTION BASED ACCESS PERIOD

CROSS REFERENCE

This application is a Continuation Application of U.S. patent application Ser. No. 13/536,145, filed Jun. 28, 2012, which claims the benefit of and priority from U.S. Provisional Patent Application Ser. No. 61/585,350, entitled "Fast block ACK and Unicast Contention Based Access Period", filed Jan. 11, 2012, the entire disclosures of which are incorporated herein by reference.

BACKGROUND

In some wireless communication networks, communication may be performed during beacon intervals (BI), which may be scheduled, for example, according to a beacon and/or an announcement frame.

A beacon interval may be divided, for example, into a plurality of access periods. Different access periods within the BI may have different access rules.

For example, the beacon interval may include at least one access period, e.g., a Data Transfer Time (DTT), which may be allocated for frame exchanges between a plurality of wireless communication devices, e.g., stations (STAs).

The DTT may include one or more contention-based access periods (CBAPs) and/or one or more service periods (SPs). During the CBAP stations may be allowed to communicate using a suitable contention-based mechanism, for example, an Enhanced distributed channel access (EDCA) mechanism.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 3 is a schematic flow-chart illustration of a method of communicating during a Contention-Based-Access-Period (CBAP), in accordance with some demonstrative embodiments.

FIG. 4 is a schematic illustration of an article of manufacture, in accordance with some demonstrative embodiments.

DETAILED DESCRIPTION

Figure 1:
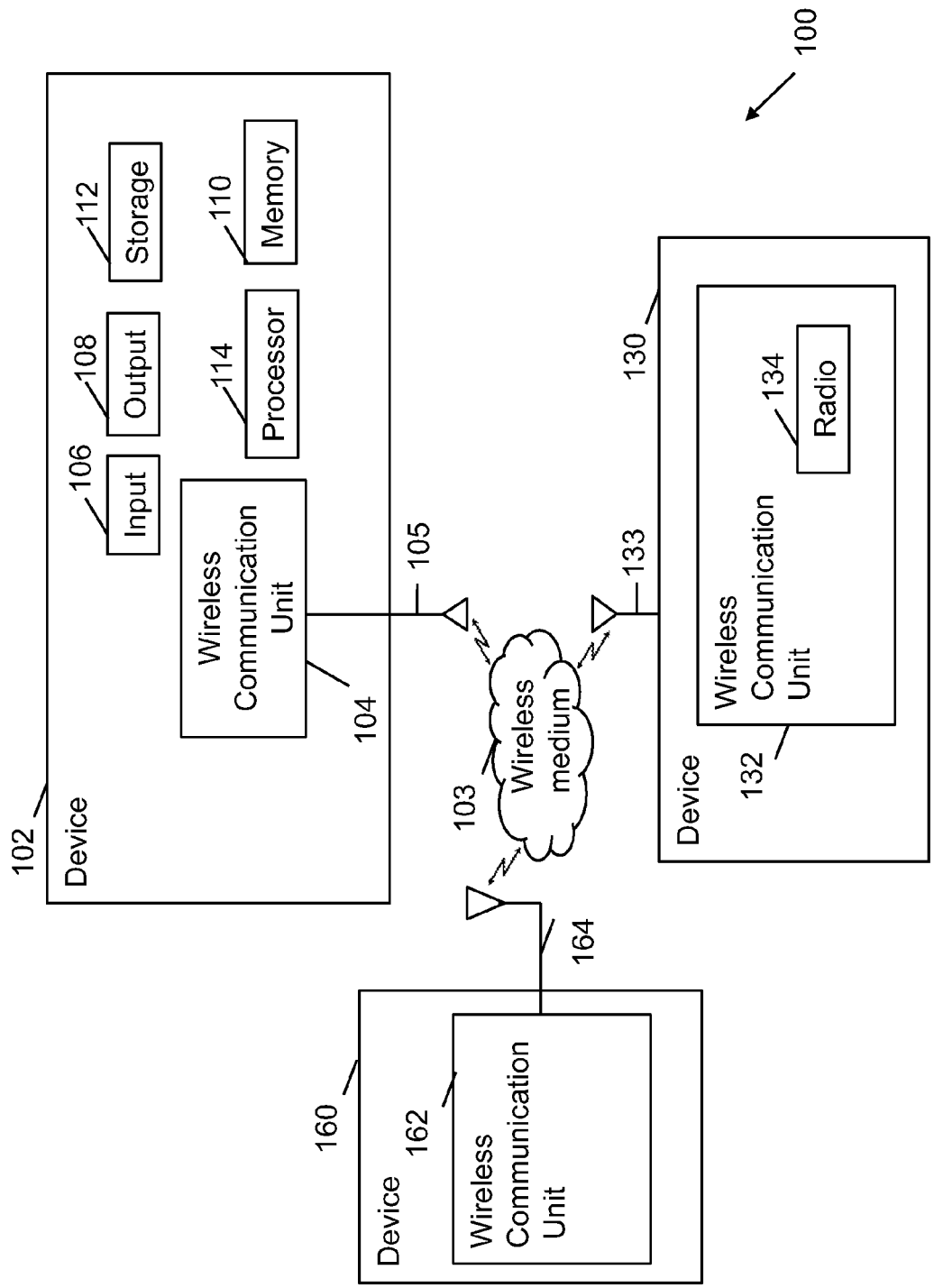
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.0, *April* 2010, *Final specification*) and/or future versions and/or derivatives thereof, devices and/or networks operating in accordance with existing IEEE 802.11 standards (*IEEE 802.11-2007, IEEE Standard for Information Technology-Telecommunications and information exchange between systems-Local and metropolitan area networks-Specific requirements, Part* 11: *Wireless LAN Medium Access Control (MAC) and Physical Layer (PHY) Specifications; IEEE* 802.11*n*-2009, *IEEE Standard for Information Technology-Telecommunications and information exchange between systems-Local and metropolitan area networks-Specific requirements, Part* 11: *Wireless LAN Medium Access Control (MAC) and Physical Layer (PHY) specifications, Amendment 5: Enhancements for Higher Throughput*; IEEE802.11 task group ac (TGac) ("*IEEE*802.11-09/0308*r*12-*TGac Channel Model Addendum Document*"); IEEE 802.11 *task group ad* (*TGad*) (*IEEE P*802.11*ad/D*1.0 *Draft Standard for Information Technology-Telecommunications and Information Exchange Between Systems-Local and Metropolitan Area Networks-Specific Requirements-Part* 11: *Wireless LAN Medium Access Control (MAC) and Physical Layer (PHY) Specifications-Amendment* 5: *Enhancements for Very High Throughput in the* 60 *GHz Band*), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16*e*, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing Wireless-WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The term "beamforming", as used herein, may relate to a spatial filtering mechanism, which may be used at a transmitter and/or a receiver to improve the received signal power or signal-to-noise ratio (SNR) at an intended receiver.

The phrase "non-access-point (non-AP) station (STA)", as used herein, may relate to a STA that is not contained within an AP.

The phrase "service period" (SP), as used herein, may relate to a contiguous time during which one or more individually addressed frames are transmitted to a STA, e.g. a quality of service (QoS) STA, and/or one or more transmission opportunities (TxOPs) are granted to the same STA.

The phrases "directional multi-gigabit (DMG)" and "directional band" (DBand), as used herein, may relate to a frequency band wherein the Channel starting frequency is above 56 GHz.

The phrases "DMG STA" and "mmWave STA (mSTA)" may relate to a STA having a radio transmitter, which is operating on a channel that is within the DMG band.

The phrase "personal basic service set" (PBSS), as used herein, may relate to a basic service set (BSS) that forms a self-contained network. For example, the PBSS may operate in the DMG band, and may include one PBSS control point (PCP).

The phrase "PBSS control point" (PCP), as used herein, may include an entity that contains one station (STA) and coordinates access to the WM by STAs that are members of a PBSS.

The phrase "non-PCP station (STA)", as used herein, may relate to a STA that is not also a PCP.

The phrase "non-PCP/non-AP station (STA)", as used herein, may relate to a STA that is not a PCP and that is not an AP.

The phrase "PCP/AP", as used herein, may relate to a STA that is a PCP or an AP.

The phrase "Contention Based Access Period (CBAP)", as used herein, may relate to a time period, during which wireless communication devices may be allowed to communicate using a suitable contention-based mechanism. In one example, the CBAP may include an access period allocated within a Data Transfer Time (DTT) within a beacon interval (BI). The CBAP may include, for example, a time period within the DTT of a DMG Basic Service Set (BSS), where enhanced distributed channel access (EDCA) is used.

The phrase "Transmit Opportunity (TxOP)", as used herein may relate to an interval of time when a particular STA, e.g., a QoS STA, has the right to initiate frame exchange sequences onto the WM. A TxOP may be defined, for example, by a starting time and a maximum duration and/or any other parameters. In one example, the TxOP may be obtained by the STA by successfully contending for the channel or assigned by a coordinator.

Reference is now made to FIG. 1, which schematically illustrates a block diagram of a system 100, in accordance with some demonstrative embodiments.

As shown in FIG. 1, in some demonstrative embodiments, system 100 may include a wireless communication network including one or more wireless communication devices, e.g., wireless communication devices 102, 160 and/or 130, capable of communicating content, data, information and/or signals over a wireless communication medium 103, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102, 160 and/or 130 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102, 160 and/or 130 may include wireless communication units 104, 162 and/or 132, respectively, to perform wireless communication between wireless communication devices 102, 160 and/or 130 and/or with one or more other wireless communication devices, e.g., as described below.

Wireless communication devices 102, 160 and/or 130 may also include, for example, one or more of a processor 114, an input unit 106, an output unit 108, a memory unit 110, and a storage unit 112. Wireless communication devices 102, 160 and/or 130 may optionally include other suitable hardware components and/or software components. In some demonstrative embodiments, some or all of the components of one or more of wireless communication devices 102, 160 and/or 130 may be enclosed in a common housing or packaging, and may be interconnected or operably associated using one or more wired or wireless links. In other embodiments, components of one or more of wireless communication devices 102, 160 and/or 130 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102, 160 and/or 130 and/or of one or more suitable applications.

Input unit 106 includes, for example, a keyboard, a keypad, a mouse, a touch-screen, a touch-pad, a track-ball, a stylus, a microphone, or other suitable pointing device or input device. Output unit 108 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication devices 102, 160 and/or 130.

In some demonstrative embodiments, wireless communication units 104, 162 and 132 may include, or may be associated with, one or more antennas 105, 164 and 133, respectively. Antennas 105, 164 and/or 133 may include any type of antennas suitable for transmitting and/or receiving wireless communication signals, blocks, frames, transmission streams, packets, messages and/or data. For example, antennas 105, 164 and/or 133 may include any suitable configuration, structure and/or arrangement of one or more antenna elements, components, units, assemblies and/or arrays. Antennas 105, 164 and/or 133 may include, for example, antennas suitable for directional communication, e.g., using beamforming techniques. For example, antennas 105, 164 and/or 133 may include a phased array antenna, a single element antenna, a set of switched beam antennas, and/or the like. In some embodiments, antennas 105, 164 and/or 133 may implement transmit and receive functionalities using separate transmit and receive antenna elements. In some embodiments, antennas 105, 164 and/or 133 may implement transmit and receive functionalities using common and/or integrated transmit/receive elements.

In some demonstrative embodiments, wireless communication units 104, 162 and/or 132 include, for example, one or more radios 134, e.g., including one or more wireless transmitters, receivers and/or transceivers able to send and/or receive wireless communication signals, RF signals, frames, blocks, transmission streams, packets, messages, data items, and/or data. For example, wireless communication units 104, 164 and/or 132 may include or may be implemented as part of a wireless Network Interface Card (NIC), and the like.

In some demonstrative embodiments, wireless communication devices 102, 160 and 130 may establish a wireless communication link. The link may include an uplink and/or a downlink. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, wireless communication devices 102, 160 and/or 130 may perform the functionality of DMG stations ("DMG STA"). For example, wireless communication devices 102, 160 and/or 130 may be configured to communicate over the DMG band.

In some demonstrative embodiments, system 100 may include a PCP/AP STA and one or more non-PCP/AP STAs. In one example, device 160 may perform the functionality of a PCP/AP STA, and/or devices 102 and/or 130 may perform the functionality of non-PCP/AP STAs. In another example, device 102 may perform the functionality of a PCP/AP STA, and/or devices 130 and/or 160 may perform the functionality of non-PCP/AP STAs.

In some demonstrative embodiments, a CBAP may be allocated for communication between two or more of devices 102, 160 and/or 130 according to a suitable contention-based mechanism, e.g., EDCA or any other contention mechanism.

In some demonstrative embodiments, the CBAP may be allocated by a PCP/AP STA. For example, the PCP/STA may transmit a scheduling element allocating the CBAP, e.g., as described below. The scheduling element may be included as part of a beacon frame or any other frame, which may be transmitted, for example, by the PCP/AP STA, e.g., by device 160. In one example, a STA, e.g., device 160, operating as a PCP/AP STA may communicate a scheduling of a BI (BI scheduling) as part of a beacon frame, an announce frame and the like. A STA, e.g., devices 102 and/or 130, operating as a non-PCP/AP STA may receive the BI scheduling and may access wireless medium 103 during scheduled periods of the scheduled BI.

In some demonstrative embodiments, the CBAP may be allocated for communication by only two STAs, e.g., devices 102 and 130.

In other demonstrative embodiments, the CBAP may be allocated for communication between more than two STAs.

In some demonstrative embodiments, a STA, e.g., device 102, 130 and/or 160, may communicate a scheduling element to schedule a CBAP ("allocated unicast CBAP") for communication between only two wireless communication stations. For example, a device, e.g., device 160, performing the functionality of a PCP/AP STA may transmit the scheduling element, e.g., as part of beacon frame, an announce frame, or any other frame, for scheduling the allocated unicast CBAP, and one or more devices performing the functionality of a non-PCP/AP STA, e.g., devices 102 and/or 130, may receive the scheduling element scheduling the allocated unicast CBAP.

In some demonstrative embodiments, the scheduling element may define a first STA of the two STAs as a source STA and a second STA of the two STAs as a destination STA.

In some demonstrative embodiments, the scheduling element may include a first field, e.g., a source field, which may include an identification of the source STA, and a second field, e.g., a destination field, which may include an identification of the destination STA.

In some demonstrative embodiments, the scheduling element may include a source association identification (AID) field including an AID of the first STA, e.g., a unicast AID of device 102, and a destination AID field including an AID of the second STA, e.g., a unicast AID of device 130.

In one example, device 160 may perform the functionality of a PCT/AP STA, and may transmit a beacon allocating a unicast CBAP for communication between devices 102 and 130. For example, the beacon may include a scheduling element with a source AID field, which includes an AID of device 102, and a destination AID field, which include an identification of device 130.

In other demonstrative embodiments, the scheduling element may include any other source field including any other identification of the source STA and/or any other destination field including any other identification of the destination STA. For example, the scheduling element may include any STA identifiers uniquely identifying the source STA and/or the destination STA, e.g., within a PBSS.

Figure 2:
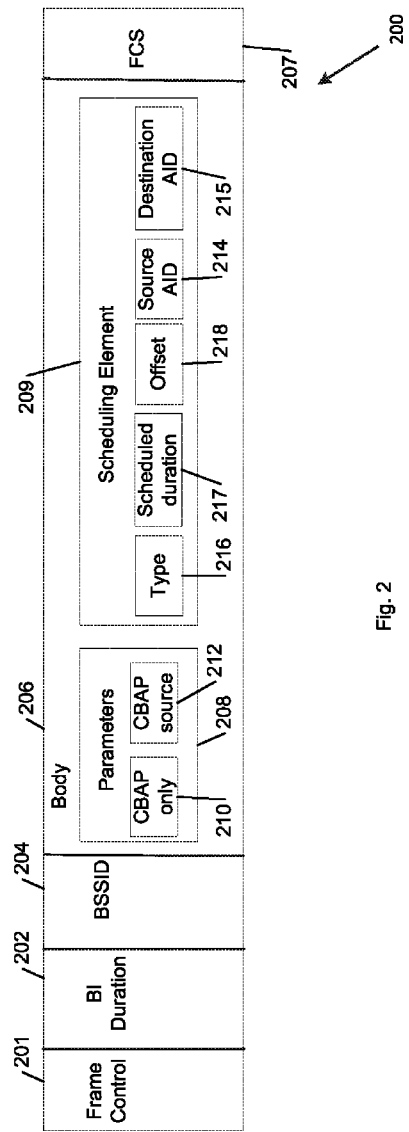
FIG. 2 is a schematic illustration of a scheduling element, in accordance with some demonstrative embodiments.

Reference is now made to FIG. 2, which schematically illustrates a beacon frame 200, which may be used to schedule a beacon interval, in accordance with some demonstrative embodiments. In some demonstrative embodiments, beacon frame 200 may be transmitted by a device, e.g., device 102, 130 and/or 160 (FIG. 1), performing the functionality of a PCP/AP STA.

In some demonstrative embodiments, beacon frame 200 may include a frame control field 201, a BI duration field 202, a BSS identifier (BSSID) field 204, a portion 206 ("body") and a frame check sequence 207.

In some demonstrative embodiments, BI duration field 202 may indicate duration of the beacon interval, and/or BSSID field may include an identification of the BSS for which the beacon interval is scheduled.

In some demonstrative embodiments, body 206 may include a parameter field (also referred to as "Dband parameter field" or "constant parameter field") 208 including a plurality of parameters to be applied during the beacon interval.

In some demonstrative embodiments, parameter field 208 may include, for example, a CBAP only field 210 to indicate a type of link access, e.g., provided by a STA sending beacon frame 200, during a DTT of the beacon interval.

In some demonstrative embodiments, CBAP only field 210 may indicate, for example, whether or not the entire DTT is to be allocated to a CBAP. For example, CBAP only field 210 may be set to a first predefined value, e.g., one, to indicate the entire DTT is to be allocated to a CBAP; or a to a second predefined value, e.g., zero, to indicate that the DTT is allocated to be used by different STAs using different access methods. The allocation may be provided by scheduling elements that may be included in the beacon or in other frames, e.g., an announce frame.

In some demonstrative embodiments, parameter field 208 may include a CBAP source field 212 to indicate whether or not only a PCP/AP STA transmitting beacon frame 200 may be allowed to initiate transmissions during the CBAP. For example, CBAP source field 212 may include a first value, e.g., one, to indicate that only the PCP/AP station may be allowed to initiate transmissions during the CBAP, or a second predefined value, e.g., zero, to indicate that any STA in the BSS may initiate transmission during the CBAP.

In some demonstrative embodiments, body 206 may include at least one scheduling element 209 to allocate at least one scheduled period (interval) during a DTT of the beacon interval.

In some demonstrative embodiments, scheduling element 209 may allocate one or more CBAPs.

In some demonstrative embodiments, scheduling element 209 may include a type filed 216 to indicate the scheduled interval relates to a CBAP, a duration field 217 to indicate a duration of the scheduled interval, and an offset field 218 to indicate an offset of the scheduled interval within the BI.

In some demonstrative embodiments, scheduling element 209 may include a CBAP source field 214, which may include an AID of a source STA defined for an allocated CBAP; and a CBAP destination field 215, which may include an AID of a destination STA allocated for the CBAP, e.g., as described herein.

In some demonstrative embodiments, scheduling element 209 may allocate a unicast CBAP, e.g., a unicast CBAP between devices 102 and 130 (FIG. 1), by setting source AID field 214 to include a first AID of a first STA, e.g., a unicast AID of device 102 (FIG. 1), and destination AID field 215 to include a unicast AID of the second STA, e.g., a unicast AID of device 130 (FIG. 1).

In some demonstrative embodiments, scheduling element 209 may be included as part of any other frame configured to allocate a CBAP, e.g., scheduling element 209 may be included as part of an announce frame.

Referring back to FIG. 1, in some demonstrative embodiments, a higher priority for sending a transmission may be provided to a selected STA scheduled of a CBAP, e.g., over all other STAs scheduled for the CBAP.

In some demonstrative embodiments, when the CBAP is scheduled for only two STAs, a first selected STA of the source STA and destination STA may be provided with a higher priority over a second selected STA of the source STA and destination STA for communicating during the CBAP.

In some demonstrative embodiments, the first selected STA may include the source STA, e.g., as indicated by source AID field 214 (FIG. 2), and the second selected STA may include the destination STA, e.g., as indicated by destination AID field 215 (FIG. 2), for example, such that the source STA may be provided with a higher priority over the destination STA, e.g., as described below. However, in other embodiments, the first selected STA may include the destination STA, and the second selected STA may include the source STA, for example, such that the destination STA may be provided with a priority over the source STA.

In some demonstrative embodiments, the higher priority may include allowing the first selected STA, e.g., the source STA, to transmit a wireless transmission upon determining, e.g., immediately after determining, that the wireless communication medium 103 is idle for a first predefined time period within the CBAP, e.g., while all other STAs scheduled for the CBAP, e.g., the destination STA, may not be allowed to transmit during the predefined time period or immediately after the predefined time period.

For example, all other STAs scheduled for the CBAP, e.g., the destination STA, may be allowed to transmit a transmission after determining that the wireless communication medium 103 is idle for a second predefined time period, e.g., longer than the first time period. For example, the other STAs scheduled for the CBAP, e.g., the destination STA, may be allowed to transmit the transmission after determining that the wireless communication medium 103 is idle for the second predefined time period and counting a back-off (BO) period, e.g., as described below.

In some demonstrative embodiments, the first time period may include a point inter frame space (PIFS) period and/or the second time period may include a distributed inter frame space (DIFS) period. In other embodiments, the first and/or second time periods may include any other periods.

In some demonstrative embodiments, providing the higher priority to the first selected STA may include allowing the first selected STA, e.g., the source STA, to transmit the wireless communication transmission upon determining, e.g., immediately after determining, that the wireless communication medium 103 is idle for the first predefined time period after a Transmit Opportunity (TxOp).

In some demonstrative embodiments, providing the higher priority to the first selected STA may include allowing the first selected STA, e.g., the source STA, to transmit the wireless communication transmission upon determining, e.g., immediately after determining, that the wireless communication medium 103 is idle for the first predefined time period measured following the beginning of the scheduled CBAP.

In some demonstrative embodiments, a wireless communication station, e.g., device 102, may transmit a wireless communication transmission over wireless communication medium 103 upon determining, e.g., immediately after determining, that the wireless communication medium 103 is idle for the first predefined time period within a CBAP, if a scheduling element allocating the CBAP, e.g., scheduling element 209 (FIG. 2), includes an indication of an identity of the wireless communication station in a predefined field, e.g., the source field 214 (FIG. 2).

In some demonstrative embodiments, the predefined field may include the source AID field. For example, device 102 may be allowed to transmit a wireless transmission over medium 103 after determining that the wireless communication medium 103 is idle for the PIFS within a CBAP, e.g., measured from the beginning of the CBAP and/or following a TxOP, only if the scheduling element, e.g., scheduling element 209 (FIG. 2), allocating the CBAP to device 102 includes the AID of device 102 in field 214 (FIG. 2).

In some demonstrative embodiments, if the scheduling element does not include the indication of the identity of the wireless communication station in the predefined field, then the wireless communication station may be allowed to transmit the transmission after a time period longer than the first time period, e.g., if the scheduling element includes the indication of the identity of the wireless communication station in another predefined field, e.g., the destination field 215 (FIG. 2).

In some demonstrative embodiments, the wireless communication station may be allowed to transmit the transmission after waiting a back-off period following the second period, which is longer than the first period. For example, device 102 may be allowed to begin counting the back-off period after determining that the wireless communication medium 103 is idle for the DIFS within the CBAP, e.g., measured from the beginning of the CBAP and/or following a TxOP, only if the scheduling element allocating the CBAP to device 102, e.g., scheduling element 209 (FIG. 2), includes the AID of device 102 in the destination field 215 (FIG. 2).

In some demonstrative embodiments, the back-off period may be determined based on a random number, e.g., the back-off period may have a duration of SlotTime*random_number, wherein SlotTime denotes a predefined constant time period. The random number may be selected, for example, from an interval $0-2^{CW}$, wherein CW denotes a contention window. The wireless communication station may be allowed to transmit the transmission immediately after the DIFS period, e.g., if the back-off period is zero, or at a later time after the DIFS period, e.g., if the back-off is greater than zero.

In some demonstrative embodiments, the PCP/AP STA scheduling the CBAP may also be allowed, in some circumstances, to transmit a transmission upon determining, e.g., immediately after determining, that the wireless communication medium is idle for the first time period within the CBAP, e.g., as described below.

In some demonstrative embodiments, a device performing the functionality of a PCP/AP STA, e.g., device 160, may be allowed to transmit a wireless transmission over wireless communication medium 103 upon determining, e.g., immediately after determining, that the wireless communication medium 103 is idle for the first time period within the CBAP, for example if an entire data transfer time (DTT) is allocated to the CBAP.

In some demonstrative embodiments, the PCP/AP station may be allowed to transmit the wireless transmission upon determining, e.g., immediately after determining, that the wireless communication medium 103 is idle for the first time period within the CBAP, for example, if the scheduling element, e.g., scheduling element 209 (FIG. 2), includes a CBAP-only field, e.g., field 210 (FIG. 2), having a value, e.g., one, indicating that the entire DTT is allocated to the CBAP, and a CBAP-source field, e.g., field 212 (FIG. 2), having a value, e.g., one, indicating that only the PCP/AP station is allowed to initiate transmissions during the CBAP.

In some demonstrative embodiments, a STA, e.g., devices 102, 160 and/or 130, may not be allowed to transmit within a unicast CBAP, for example, unless an AID of the STA is equal to the value of a destination AID field, e.g., field 215 (FIG. 2), of the scheduling element allocating the CBAP, e.g., scheduling element 209 (FIG. 1); if the AID of the STA is equal to the value of the source AID field, e.g., field 214 (FIG. 2), of the scheduling element; or if the STA performs the role of a PCP/AP STA, and both the CBAP only field, e.g., field 210 (FIG. 2), in a beacon, beacon frame 200 (FIG. 2), allocating the CBAP, is equal to one, and a CBAP source field, e.g., CBAP source field 212 (FIG. 2), of the beacon is equal to one.

In some demonstrative embodiments, if the AID of the STA is equal to the value of the source AID field, or if the STA performs the role of a PCP/AP STA, and both the CBAP only field and the CBAP source field are equal to one, then the STA may be allowed to initiate a transmission within the CBAP immediately after determining that the wireless communication medium 103 is idle for the PIFS period, e.g., as described above.

Reference is made to FIG. 3, which schematically illustrates a method of communicating during a CBAP, in accordance with some demonstrative embodiments. In some embodiments, one or more of the operations of the method of FIG. 3 may be performed by a wireless communication system e.g., system 100 (FIG. 1); a wireless communication device, e.g., devices 102, 160 and/or 130 (FIG. 1); and/or a wireless communication unit, e.g., wireless communication units 104, 162 and/or 132 (FIG. 1).

As indicated at block 302, the method may include communicating a scheduling element allocating a CBAP. The scheduling element may include a source field defining a source STA and a destination field defining a destination STA. For example, a device, e.g., device 160 (FIG. 1), performing the functionality of a PCP/AP STA may transmit a scheduling element scheduling a CBAP, e.g., scheduling element 209 (FIG. 2), and one or more devices, e.g., devices 102 (FIG. 1) and/or 130 (FIG. 1), performing the functionality of a non-PCP/AP STA may receive the scheduling element, e.g., as described above.

As indicated at block 304, the method may include allowing a wireless communication station to transmit a wireless communication transmission over a wireless communication medium upon determining, e.g., immediately after determining, that the wireless communication medium is idle for a predefined time period within the CBAP, if the scheduling element allocating the CBAP includes an indication of an identity of the wireless communication station in a predefined field. For example, device 102 (FIG. 1) may be allowed to transmit a wireless communication transmission over wireless communication medium 103 (FIG. 1) immediately after determining that the wireless communication medium 103 (FIG. 1) is idle for a PIFS within the CBAP, e.g., a PIFS measured from the beginning of the CBAP or a PIFS measured following a TxOP, if the scheduling element 209 (FIG. 2) allocating the CBAP includes the AID of device 102 (FIG. 1) in the source field 214 (FIG. 2), e.g., as described above.

As indicated at block 306, the method may include allowing the wireless communication station to transmit the wireless transmission after at least a second predefined period, if the scheduling element includes the indication of the identity of the wireless communication station in another predefined field.

As indicated at block 307, allowing the wireless communication station to transmit the wireless transmission after at least the second predefined period may include allowing the wireless communication station to transmit the wireless transmission after a back-off period following the second predefined period. For example, device 102 (FIG. 1) may be allowed to transmit the wireless communication transmission over wireless communication medium 103 (FIG. 1) after counting a back-off period after determining that the wireless communication medium 103 (FIG. 1) is idle for a DIFS within the CBAP, e.g., a DIFS measured from the beginning of the CBAP or a DIFS measured following a TxOP, if the scheduling element 209 (FIG. 2) allocating the CBAP includes the AID of device 102 (FIG. 1) in the destination field 215 (FIG. 2), e.g., as described above.

As indicated at block 308, the method may include allowing a PCP/AP station to transmit a wireless transmission upon determining, e.g., immediately after determining, that the wireless communication medium is idle for the first predefined time period within the CBAP, if an entire data transfer time (DTT) is allocated to the CBAP. For example, a device, e.g., device 160 (FIG. 1), performing the functionality of a PCP/AP STA may be allowed to transmit a wireless communication transmission over wireless communication medium 103 (FIG. 1) immediately after determining that the wireless communication medium 103 (FIG. 1) is idle for a PIFS within the CBAP, e.g., a PIFS measured from the beginning of the CBAP or a PIFS measured following a TxOP, if the beacon frame 200 (FIG. 2) allocating the CBAP includes CBAP-only field 210 (FIG. 2) having a value indicating that the entire DTT is allocated to the CBAP, and CBAP-source field 212 (FIG. 2) having a value indicating that only the PCP/AP STA is allowed to initiate transmissions during the CBAP, e.g., as described above.

Reference is made to FIG. 4, which schematically illustrates an article of manufacture 400, in accordance with some demonstrative embodiments. Article 400 may include a non-transitory machine-readable storage medium 402 to store logic 404, which may be used, for example, to perform at least part of the functionality of device 102 (FIG. 1), device 130 (FIG. 1), device 160 (FIG. 1), wireless communication unit 104 (FIG. 1), wireless communication unit 162 (FIG. 1), wireless communication unit 132 (FIG. 1) and/or to perform one or more operations of the method of FIG. 3. The phrase "non-transitory machine-readable medium" is directed to include all computer-readable media, with the sole exception of being a transitory propagating signal.

In some demonstrative embodiments, article 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication station to communicate over a wireless communication medium, the wireless communication station comprising:
a receiver to receive a scheduling element to allocate a contention-based-access period (CBAP), the scheduling element including a source association identification (AID) field; and
a transmitter configured to transmit a wireless communication transmission within the CBAP immediately after the wireless communication medium is determined to be idle for one point inter frame space (PIFS) period, if when an AID of said wireless communication station is equal to a value of said source AID field.

2. The wireless communication station of claim 1, wherein the transmitter is allowed to transmit said transmission within the CBAP, if when the AID of the wireless communication station is equal to a value of a destination AID field of the scheduling element.

3. The wireless communication station of claim 2, wherein the transmitter is configured to transmit said transmission after waiting a back-off period following a distributed inter frame space (DIFS) period.

4. The wireless communication station of claim 1, wherein the transmitter is to transmit said wireless communication transmission within the CBAP immediately after the wireless communication medium is determined to be idle for the PIFS period, when the wireless communication station is configured to perform the role of a personal basic service set control point (PCP) or access point (PCP/AP) station.

5. The wireless communication station of claim 1, wherein the scheduling element is from a personal basic service set control point (PCP) or access point (PCP/AP) station.

6. The wireless communication station of claim 5, wherein the transmitter is configured to transmit said wireless communication transmission within the CBAP immediately after the wireless communication medium is determined to be idle for the PIFS period, when the scheduling element includes a CBAP only field having a value indicating that an entire data transfer time (DTT) is allocated to said CBAP, and a CBAP-source field having a value indicating that only the PCP/AP station is allowed to initiate transmissions during the CBAP.

7. The wireless communication station of claim 1 being a directional multi-gigabit (DMG) station.

8. A wireless communication system comprising:
at least one wireless communication station including:
a phase array antenna; and
a radio operably coupled to the phase array antenna, the radio comprising:
a receiver configured to receive a scheduling element to allocate a contention-based-access period (CBAP), the scheduling element including a source association identification (AID) field; and
a transmitter configured to transmit a wireless communication transmission within the CBAP immediately after the wireless communication medium is determined to be idle for one point inter frame space (PIFS) period, if when an AID of said wireless communication station is equal to a value of said source AID field.

9. The wireless communication system of claim 8, wherein the wireless communication station is not allowed to transmit said transmission within the CBAP unless the AID of the wireless communication station is equal to the value of a destination AID field of the scheduling element.

10. The wireless communication system of claim 9, wherein said wireless communication station is to transmit said transmission after waiting a back-off period following a distributed inter frame space (DIFS) period.

11. The wireless communication system of claim 8, wherein said wireless communication station is to allow said wireless communication transmission within the CBAP immediately after the wireless communication medium is determined to be idle for the PIFS period, when the wireless communication station is to perform the role of a personal basic service set control point (PCP) or access point (PCP/AP) station.

12. The wireless communication system of claim 8, wherein said wireless communication station is to allow said wireless communication transmission within the CBAP immediately after the wireless communication medium is determined to be idle for the PIFS period, when the scheduling element includes a CBAP-only field having a value indicating that an entire data transfer time (DTT) is allocated to said CBAP, and a CBAP-source field having a value indicating that only a personal basic service set control point (PCP) or access point (PCP/AP) station is allowed to initiate transmissions during the CBAP.

13. The wireless communication system of claim 8, wherein said wireless communication station is a directional multi-gigabit (DMG) station.

14. A method to be performed by either a personal basic service set control point (PCP) or an access point (PCP/AP), the method comprising:
transmitting a scheduling element to allocate a contention-based-access period (CBAP), the scheduling element including a source association identification (AID) field; and
receiving a wireless communication transmission transmitted from a station within the CBAP immediately after the wireless communication medium is determined to be idle for one point inter frame space (PIFS) period, when an AID of said station is equal to a value of said source AID field.

15. The method of claim 14 comprising:
transmitting said scheduling element including a destination AID field; and
receiving within the CBAP a transmission from a station having an AID equal to a value of the destination AID field.

16. The method of claim 14, comprising:
transmitting the scheduling element including a CBAP-only field having a value indicating that an entire data transfer time (DTT) is allocated to said CBAP, and a CBAP-source field having a value indicating that only the PCP/AP station is allowed to initiate transmissions during the CBAP.

17. A computer program product comprising one or more tangible computer readable non-transitory storage media comprising computer-executable instructions operable to, when executed by at least one processor logic, enable the at least one processor logic to implement one or more operations of transmitting a wireless communication transmission performed by a wireless communication station, the operations comprising:
receiving a scheduling element to allocate a contention-based-access period (CBAP), the scheduling element including a source association identification (AID) field; and
transmitting a wireless communication transmission within the CBAP immediately after the wireless communication medium is determined to be idle for one point inter frame space (PIFS) period, when an AID of said wireless communication station is equal to a value of said source AID field.

18. The computer program of claim 17, wherein the operations comprise:
transmitting said transmission within the CBAP, when the AID of the wireless communication station is equal to the value of a destination AID field of the scheduling element.

19. The computer program of claim 18, wherein the operation s comprise:
transmitting said transmission after waiting a back-off period following a distributed inter frame space (DIFS) period.

20. The computer program of claim 17, wherein the operations comprise:
transmitting said wireless communication transmission within the CBAP immediately after the wireless communication medium is determined to be idle for the PIFS period, when said wireless communication station performs the role of a personal basic service set control point (PCP) or access point (PCP/AP) station.

21. The computer program of claim 17, wherein the operations comprise:
transmitting said wireless communication transmission within the CBAP immediately after the wireless communication medium is determined to be idle for the PIFS period, when the scheduling element includes a CBAP-only field having a value indicating that an entire data transfer time (DTT) is allocated to said CBAP, and a CBAP-source field having a value indicating that only a personal basic service set control point (PCP) or access point (PCP/AP) station is allowed to initiate transmissions during the CBAP.

* * * * *